(12) United States Patent
Liu et al.

(10) Patent No.: US 7,847,188 B2
(45) Date of Patent: Dec. 7, 2010

(54) CABLE ASSEMBLY

(75) Inventors: Yao-Hsuan Liu, Taipei (TW); Atul Sharma, Irving, TX (US); Yuhtseng Chew, Rowland Heights, CA (US)

(73) Assignee: Volex Group P.L.C. (GB)

( * ) Notice: Subject to any disclaimer, the term of this patent is extended or adjusted under 35 U.S.C. 154(b) by 270 days.

(21) Appl. No.: 12/209,543

(22) Filed: Sep. 12, 2008

(65) Prior Publication Data

US 2010/0065299 A1 Mar. 18, 2010

(51) Int. Cl.
*H01B 11/06* (2006.01)
(52) U.S. Cl. ............... 174/36; 439/620.01; 439/620.03
(58) Field of Classification Search ............... 174/74 R, 174/78, 75 R, 75 C, 84 R, 88 R, 88 C
See application file for complete search history.

(56) References Cited

U.S. PATENT DOCUMENTS

| 3,945,708 | A |   | 3/1976  | Griffin      |            |
|-----------|---|---|---------|--------------|------------|
| 4,634,208 | A |   | 1/1987  | Hall et al.  |            |
| 4,761,147 | A | * | 8/1988  | Gauthier     | 439/607.01 |
| 4,822,304 | A | * | 4/1989  | Herron       | 439/607.57 |
| 5,180,314 | A |   | 1/1993  | Gelin et al. |            |
| 5,201,676 | A | * | 4/1993  | Duffield et al. | 439/607.51 |
| 5,658,170 | A |   | 8/1997  | Tan et al.   |            |
| 5,749,656 | A |   | 5/1998  | Boehm et al. |            |
| 6,142,829 | A | * | 11/2000 | O'Groske et al. | 439/620.08 |
| 2007/0105404 | A1 |   | 5/2007 | Lee et al.  |            |
| 2008/0081492 | A1 |   | 4/2008 | Sawatari et al. |        |

FOREIGN PATENT DOCUMENTS

EP  0945731  9/1999

OTHER PUBLICATIONS

International Search Report issued for PCT/US2009/056592, dated Dec. 30, 2009 (4 pages).

* cited by examiner

*Primary Examiner*—William H Mayo, III
(74) *Attorney, Agent, or Firm*—Wilmer Cutler Pickering Hale & Dorr LLP.

(57) ABSTRACT

A method of applying a premold to a cable. The cable may have a plurality of shielded pairs, where the shielded pairs have conductors. A premold is applied to the cable, where the shielded pairs are aligned within the premold. A deformable material is wrapped over the premold. A shell is applied over the deformable material. The premold is sufficiently hard so as to protect the conductors from deformation when applying the shell. A portion of the conductors may be deformed before being welded.

20 Claims, 6 Drawing Sheets

CABLE ASSEMBLY

BACKGROUND OF THE INVENTION

1. Field of the Invention

The inventions relate to a cable assembly.

2. Description of Related Art

One concern in data communications is signal integrity. Factors that affect signal integrity include cable design and the process that is used to terminate or attach a cable. Cables are typically made of a plated center conductor covered by a dielectric and a braid or foil shield protector with an overall non-conductive jacket. The termination of the braid onto a device, such as a printed circuit board (PCB) or a connector, can significantly affect cable performance.

One way to terminate a braid is to strip the end of the braid and solder the end of the wire onto a PCB/connector termination. One popular method of soldering a wire onto a solder pad is hot bar soldering. One problem with this method in that a large amount of heat must be introduced during the solder. The heat causes the dielectric to melt and subsequently shrink. In addition, a significant amount of time is often consumed by this method. Finally, the solder pad, PCB, or connection material may burn when using hot bar soldering.

Laser terminating is another method of terminating a wire onto a PCB/connector, but it also has problems such as a tendency to burn and variable power. Also, the timing of the laser pulse needs to be within very tight tolerances.

Parallel gap resistance welding is another method of terminating a wire onto a PCB/connector. One problem with resistance welding is that it is very difficult, and sometimes impossible, to resistance weld a wire of 28 AWG or higher gage size. This is because a large amount of heat is necessary to weld a wire of that thickness, and the heat has a tendency to burn the solder pad on the PCB or the connection material.

However, parallel gap resistance welding has advantages over hot bar welding. There is no shrinking of the cable dielectric with parallel gap resistance welding, and the time needed to make the weld is significantly shorter than the time to solder.

A common way to terminate a braid is to use a ferrule. One significant problem with a ferrule is that crimping the wire to apply the ferrule tends to crush the cable dielectric. Another problem with existing methods of terminating a braid is that they can tend to rearrange the placement of the differential pair within the cable jacket. Both problems can affect impedance and other electrical parameters, which affect signal integrity.

BRIEF SUMMARY OF THE INVENTION

The invention provides methods and systems for improving data transfers within cable assemblies.

One embodiment of the invention includes a method of applying a strain relief premold, also called a mold, to a cable, where the premold is sufficiently hard so as to protect the conductors within the shielded pairs within the cable from being crushed.

Another embodiment of the invention includes a cable comprising a plurality of shielded pairs, with a mold fastened around the cable, and a clamshell applied over the mold, where the mold protects the cable from being crushed when the clamshell is applied. In some embodiments, the cable comprises a single conductor.

In another embodiment, the invention includes a method of attaching a cable to a printed circuit board, where a portion of a 24 AWG or larger size conductor of a wire or cable is deformed and after deforming the thickness of the conductor is substantially the same as the diameter of smaller size cable, and resistance welding the deformed conductor. By way of nonlimiting example, a 24 AWG conductor may be deformed according to the methods provided herein such that the thickness of the resulting deformed portion of the cable is substantially the same as the diameter of a non-deformed 30 AWG cable.

These and other features and advantages will become apparent from the drawings and detailed description.

DETAILED DESCRIPTION

Figure 1:
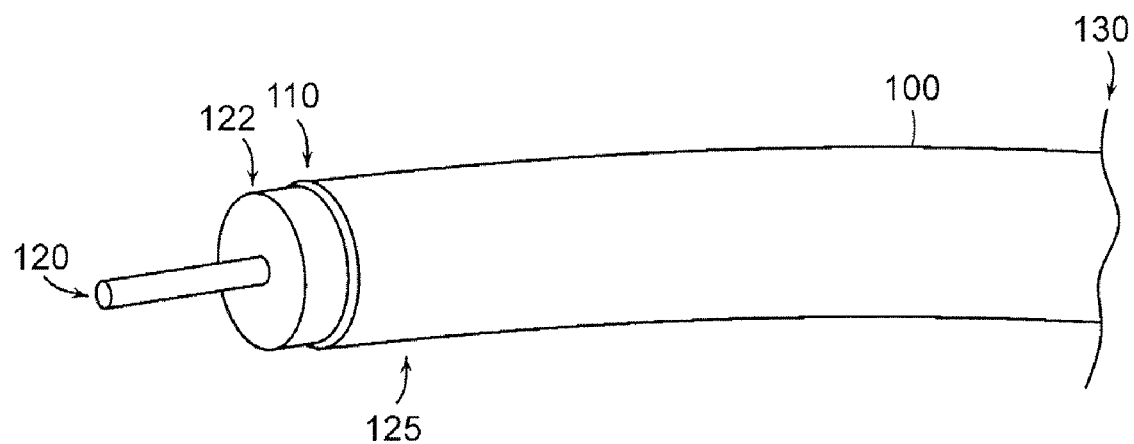
FIG. 1 illustrates an example of a single wire associated with embodiments of the present invention.

A cable 100 is illustrated in FIG. 1. Cable 100 has a cable jacket 110, dielectric 122, and center conductor 120. Cable jacket 110 may, for example, be made up of a single braid of material, or may contain both an outer braid and an inner braid. Cable 100 includes a proximal portion 125 and a distal portion 130. Cable 100 can transfer data between and among storage devices, switches, routers, printed circuit boards (PCBs), analog to digital converters, connectors, and other devices. In various embodiments, cable 100 can support data transfer rates of 100 Mbps and higher. In some embodiments, cable 100 can support data transfer rates of approximately 4.25 Gbps to approximately 25 Gbps, including by way of non-limiting examples, approximately 4.25 Gbps, approximately 10 Gbps, and approximately 25 Gbps. Cable 100 also can be used with data transfer rates above or below these exemplary rates.

Figure 2:
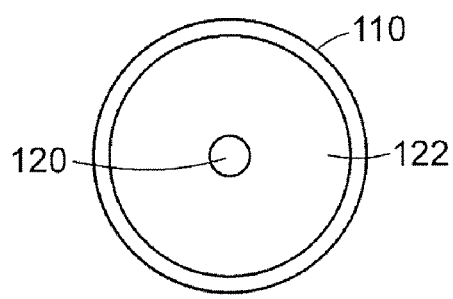
FIG. 2 illustrates an example of a cross-sectional view of a single wire of embodiments of the present invention.

FIG. 2 illustrates a cross-sectional view of a proximal portion 125 of cable 100. FIG. 2 shows center conductor 120, which extends substantially the length of cable 100, and in some aspects extends past cable jacket 110 in a direction along the length of cable 100.

Figure 3:
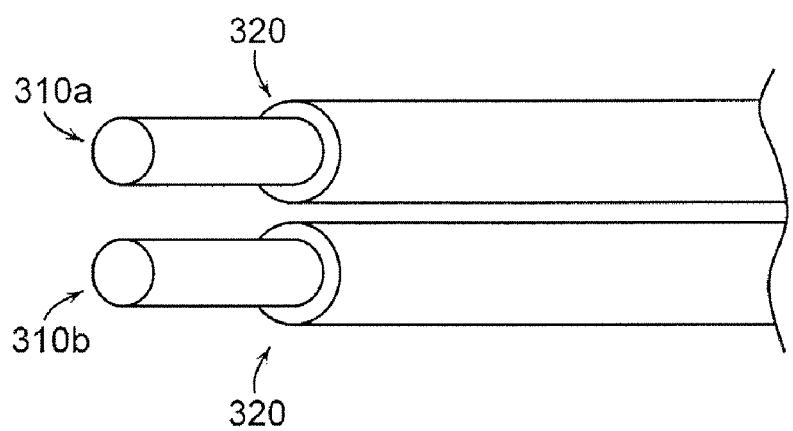
FIGS. 3 and 3A illustrate a single shielded pair as may be used with embodiments of the present invention.
Figure 3A:
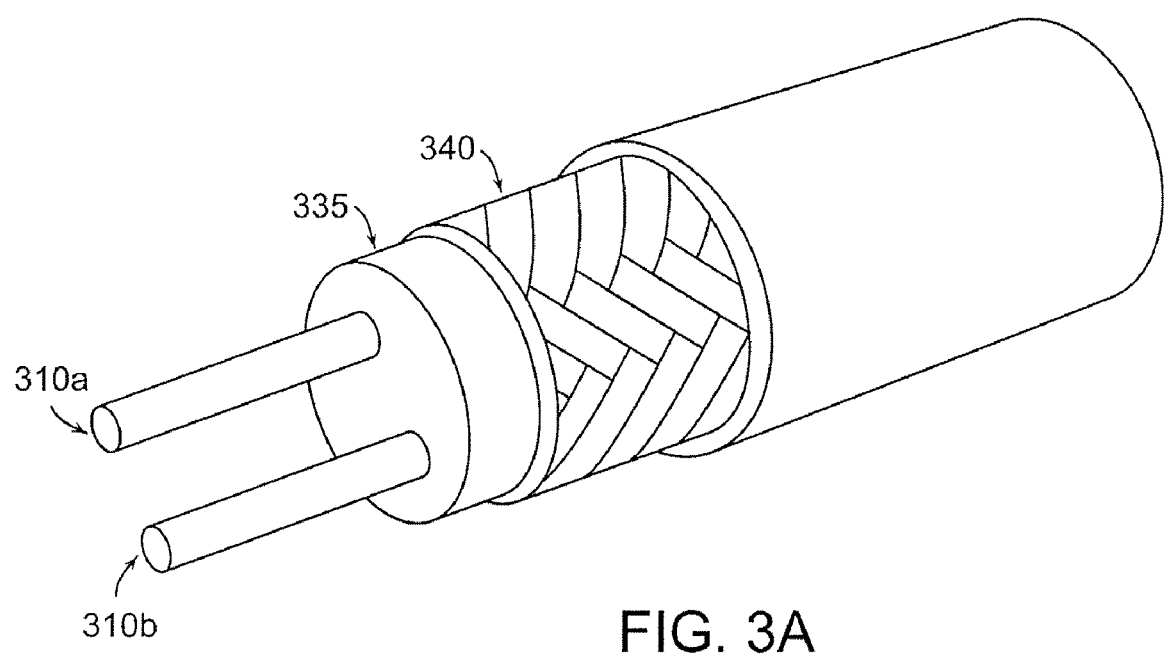

FIGS. 3 and 3A illustrate a single shielded pair. Referring to FIG. 3A, each shielded pair has parallel conductors 310 (indicated as 310a and 310b) separated by a solid dielectric 335 and surrounded by braided copper tubing 340. Referring to FIG. 3, in some aspects, conductors 310 are each surrounded by insulators 320. Conductors 310 and insulators 320 extend substantially the length of cable 100. Conductors 310 extend past insulators 320, in a direction along the length of conductors 310, at the proximal end, the distal end, or both ends.

Figure 4:
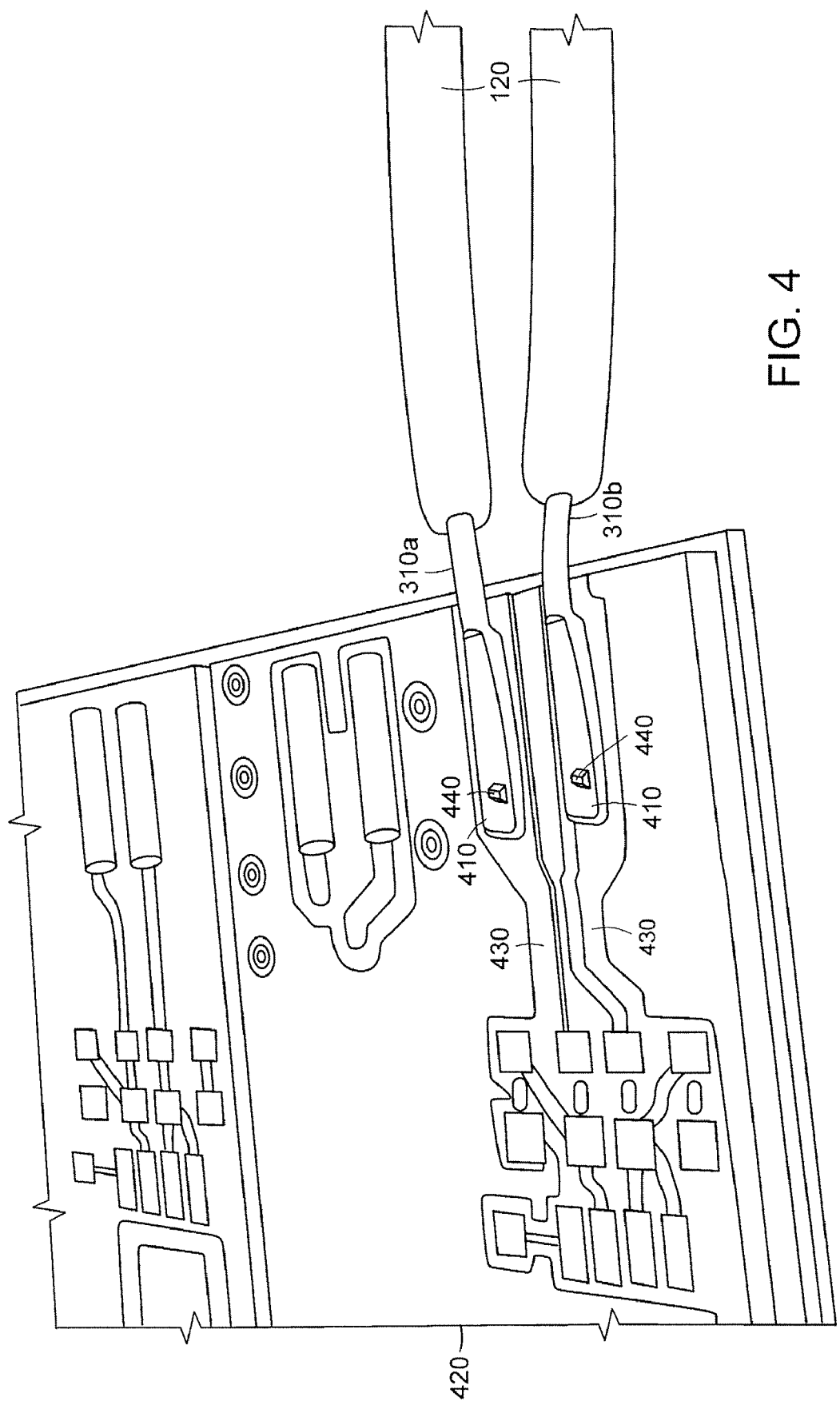
FIG. 4 illustrates an example of a weld between a single shielded pair and a printed circuit board according to some aspects of the present invention.

FIG. 4 illustrates a single shielded pair 120, the conductors 310 of which have been welded to PCB trace pads 430 of a printed circuit board 420. In some embodiments, conductors 310 are 24 AWG. The proximal ends of conductors 310 have been deformed. In some embodiments, each of conductors 310 is deformed. In other embodiments, one or more of conductors 310 are deformed. One way to deform the proximal ends of conductors 310 is to flatten them. One way to flatten the proximal ends of conductors 310 into deformed portions 410 is via a Schmidt press. In some embodiments, the thickness of the deformed portion 410 is substantially the same as the diameter of a 30 AWG conductor. Deformed portions 410 are resistance welded to PCB trace pads 430 of printed circuit board 420. Detents 440 on deformed portions 410 can result from welding deformed portions 410 onto PCB trace pads 430. In some embodiments, deformed portions 410 are double welded onto the same joint to more securely connect shielded pair 120 to PCB 420. The proximal ends of conductors 310 are preferably welded to PCB trace pads 430 such that flattened portions 410 remain within the outline of PCB trace pads 430. This helps to control impedance issues.

Figure 5:
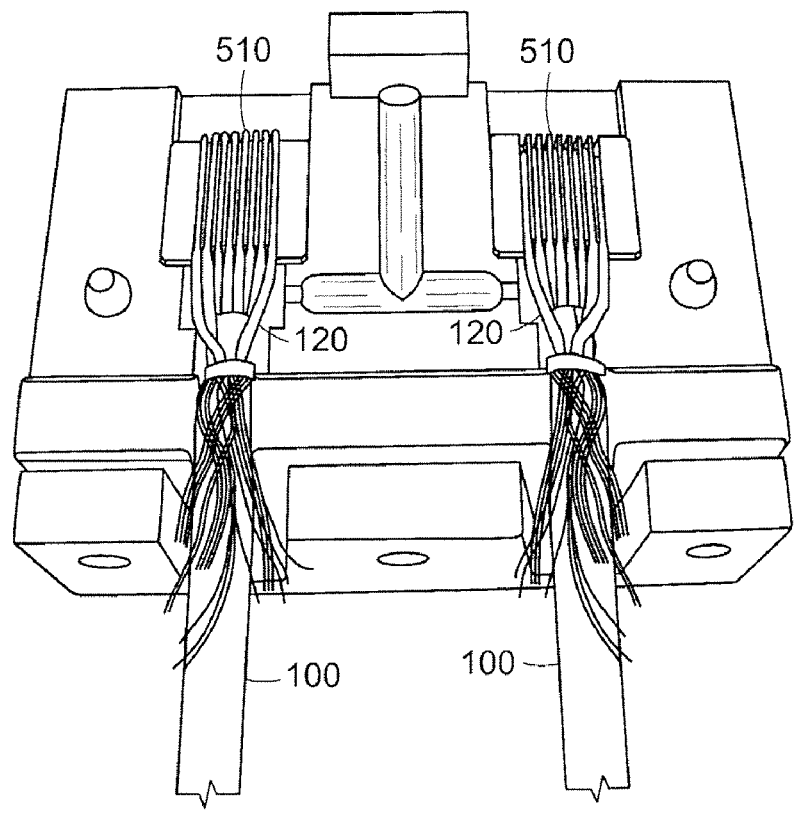
FIG. 5 illustrates an example of two cables before premolds of embodiments of the present invention are applied.

FIG. 5 illustrates two cables 100 before molds are applied to them. In some embodiments, cables 100 are cut to a specific length. Shielded pairs 120 extend beyond the proximal end of cable jacket 110, which have been pulled back from the proximal ends 125 of cables 100. Shielded pairs 120 are aligned into predetermined fixtures 510. Fixtures 510 allow shielded pairs 120 to lie substantially parallel to each other and in substantially the same plane near their proximal ends.

Figure 6:
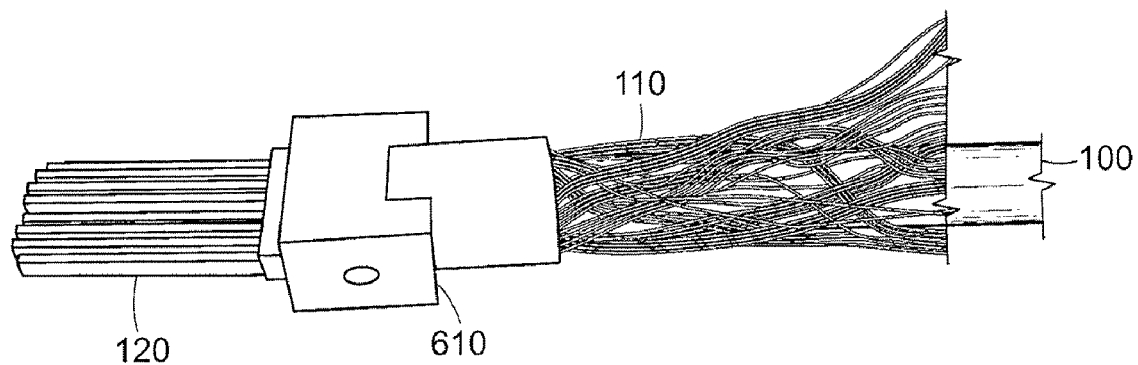
FIG. 6 illustrates an example of a strain relief premold of embodiments of the present invention.

FIG. 6 illustrates premold 610. Premold 610 is applied to cable 100. The distal end of premold 610 has a tubular shape, and surrounds the proximal end of cable jacket 110. The proximal end of premold 610 surrounds shielded pairs 120 near the proximal ends of shielded pairs 120. However, shielded pairs 120 extend beyond the proximal end of premold 610. Premold 610 is secured around the proximal end of cable 100 and a portion of shielded pairs 120 near their proximal ends.

In some embodiments, premold 610 is made of a rigid material. Nonlimiting examples of materials from which premold 610 can be made include plastic and polycarbonate.

Figure 6A:
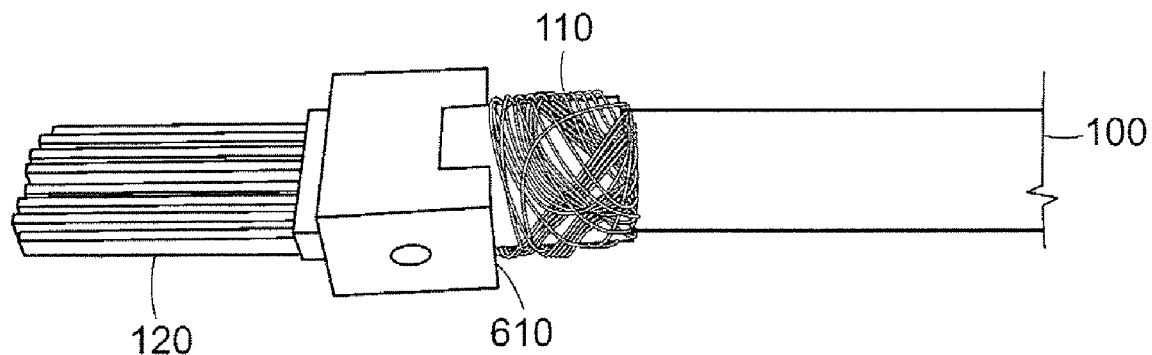
FIG. 6A illustrates a portion of a cable jacket wrapped around a portion of a premold according to embodiments of the present invention.

FIG. 6A illustrates a portion of cable jacket 110 after it has been pulled back from the proximal end of cable 100 and wrapped around a portion of premold 610. The portion of cable jacket 110 is preferably wrapped around the distal end of premold 610. As illustrated in FIG. 6A, the distal end of premold 610 has a tubular shape.

Figure 6B:
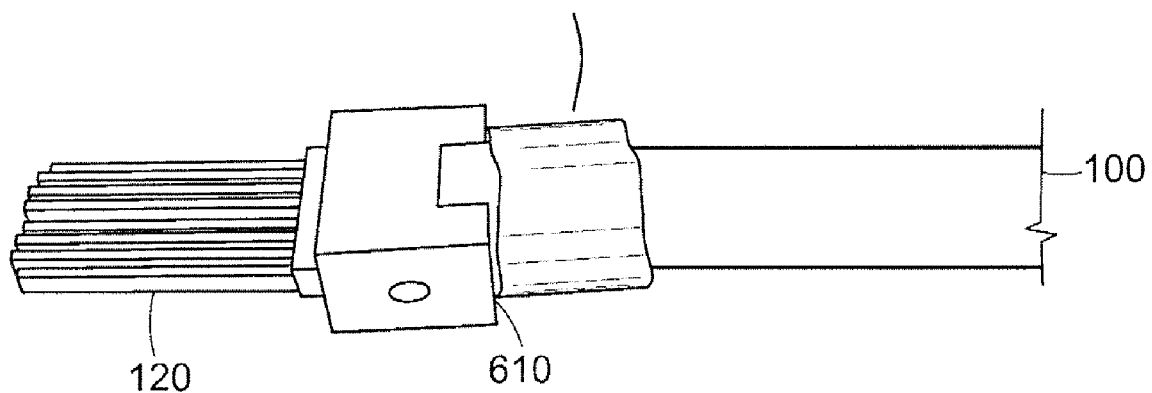
FIG. 6B illustrates copper tape wrapped over a portion of a premold according to embodiments of the present invention.

After a portion of cable jacket 110 is wrapped around the distal end of premold 610, copper tape 630 is applied over the wrapped portion of cable jacket 110 and thus over the distal end of premold 610 as illustrated in FIG. 6B.

Figure 7:
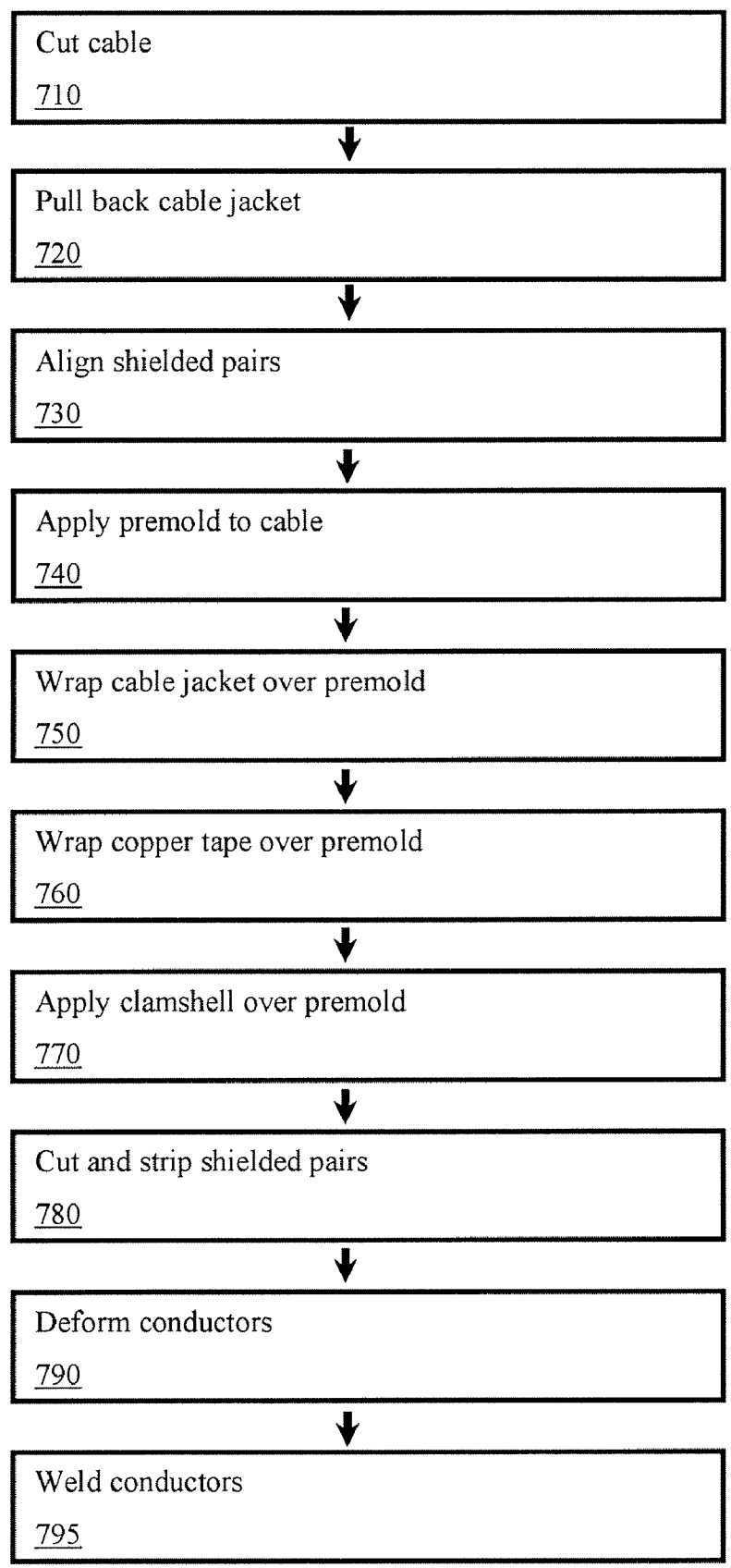
FIG. 7 illustrates a method of applying a premold to a cable.

FIG. 7 is a flowchart illustrating an example of a method of applying premold 610 to cable 100. In step 710, cable 100 is cut to a specific length. Cable jacket 110 is pulled back from the proximal end of cable 100 in step 720. In step 730, shielded pairs 120 are aligned into predetermined fixtures 510. In step 740, premold 610 is applied to cable 100 and shielded pairs 120 such that shielded pairs 120 are aligned within the proximal end of premold 610. In step 750, a portion of cable jacket 110 that was pulled back from the proximal end of cable 100 is wrapped around a portion of premold 610. In another embodiment, step 750 is omitted. In step 760, copper tape 630 is wrapped around a portion of premold 610. If step 750 is performed, copper tape 630 in step 760 is also wrapped around at least a portion of cable jacket 110 that is wrapped around premold 610. In step 770, a clamshell or other shell is applied over premold 610. The clamshell is preferably applied by mechanical force. This mechanical force crushes a portion of cable jacket 110 if step 750 is performed. The mechanical force also crushes and secures copper tape 630 wrapped around premold 610 within the clamshell. The crushing force applied in step 770 tightens the clamshell over the copper tape to tighten around premold 610. Because premold 610 is hard, the crushing force from the clamshell does not deform premold 610. Because premold 610 is not deformed, the portion of cable 100 within premold 610 is also not deformed. In step 780, shielded pairs 120 are cut and stripped. In step 790, conductors 310 are deformed as described above, using for example a Schmidt press. In other embodiments, steps 780 and/or 790 are omitted. In step 795, conductors 310 are welded to appropriate PCB trace pads 430 of PCB 420. In other embodiments, other methods are used to attach conductors 310 to PCB trace pads 430.

Although various embodiments have been described in detail herein by way of illustration, it is understood that such detail is solely for that purpose and variation can be made by those skilled in the art without departing from the spirit and scope of the inventions.

What is claimed is:

1. A method of applying a premold to a cable, the method comprising:
   providing a cable having a plurality of shielded pairs, wherein the shielded pairs comprise conductors;
   applying a premold to the cable;
   wrapping a deformable material over the premold; and
   applying a shell over the deformable material,
   wherein the shielded pairs are aligned within the premold and wherein the premold is sufficiently hard so as to protect the conductors from deformation when applying the shell.

2. The method of claim 1, further comprising cutting the cable.

3. The method of claim 1, further comprising:
   peeling back a portion of a braid around the shielded pairs prior to applying the premold, and
   wrapping a portion of the braid over a portion of the premold.

4. The method of claim 1, wherein the premold includes plastic or polycarbonate.

5. The method of claim 1, wherein providing a cable comprises aligning shielded pairs within the cable into a fixture.

6. The method of claim 1, wherein the shell is a clamshell.

7. The method of claim 5, wherein the deformable material comprises copper.

8. The method of claim 7, further comprising cutting and stripping the shielded pairs.

9. The method of claim 7, further comprising welding conductors within the shielded pairs to a printed circuit board, an analog to digital converter, or a connector.

10. The method of claim 9, further comprising:
    deforming at least one of the conductors before welding the conductors.

11. The method of claim 9, wherein the welding includes resistance welding.

12. A data cable assembly comprising:
    a cable;
    a plurality of shielded pairs within the cable;
    a premold fastened around the cable,
    wherein the premold provides alignment to the shielded pairs, and a shell applied over the premold, wherein the premold is sufficiently hard so as to protect the shielded pairs from deformation when the shell is applied.

13. The data cable assembly of claim 12, wherein the premold is comprised of plastic or polycarbonate.

14. The data cable assembly of claim 12, wherein the cable has a data transfer capacity of approximately 100 Mbps or higher.

15. The data cable assembly of claim 12, wherein the shell is a clamshell.

16. A data cable assembly comprising:
   a cable;
   a single conductor within the cable;
   a premold fastened around the cable; and
   a shell applied over the premold, wherein the premold is sufficiently hard so as to protect the conductor from deformation when the shell is applied.

17. The data cable assembly of claim 16, wherein the premold is comprised of plastic or polycarbonate.

18. A method of attaching a cable to a device, the method comprising:
   deforming a portion of a 24 AWG or larger gauge size conductor of a shielded pair,
   wherein after deforming, the thickness of the conductor is substantially the same as the diameter of smaller gauge wire, and
   resistance welding the deformed conductor to the device.

19. The method of claim 18, wherein the device includes a printed circuit board.

20. The method of claim 18, wherein the device includes a connector.

* * * * *